United States Patent
Li et al.

(10) Patent No.: US 11,438,098 B2
(45) Date of Patent: Sep. 6, 2022

(54) DATA TRANSMISSION METHOD, SENDING APPARATUS, AND RECEIVING APPARATUS

(71) Applicant: HUAWEI TECHNOLOGIES CO., LTD., Guangdong (CN)

(72) Inventors: Aini Li, Shenzhen (CN); Qiwen Zhong, Shenzhen (CN); Rixin Li, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/910,477

(22) Filed: Jun. 24, 2020

(65) Prior Publication Data
US 2020/0322087 A1 Oct. 8, 2020

Related U.S. Application Data

(63) Continuation of application No. PCT/CN2018/113590, filed on Nov. 2, 2018.

(30) Foreign Application Priority Data

Dec. 25, 2017 (CN) .......................... 201711426203.7

(51) Int. Cl.
*H04L 1/00* (2006.01)
*H04L 5/00* (2006.01)

(52) U.S. Cl.
CPC .......... *H04L 1/0057* (2013.01); *H04L 1/0041* (2013.01); *H04L 5/0044* (2013.01)

(58) Field of Classification Search
CPC ... H04L 1/0057; H04L 1/0041; H04L 5/0044; H04L 1/0061; H04L 1/0064;
(Continued)

(56) References Cited

U.S. PATENT DOCUMENTS

| 7,657,695 B1 | 2/2010 | Wheeler | |
| 2002/0015405 A1* | 2/2002 | Sepponen | H04L 1/0085 |
| | | | 370/328 |

(Continued)

FOREIGN PATENT DOCUMENTS

| CN | 1983913 A | 6/2007 |
| CN | 101317397 A | 12/2008 |

(Continued)

OTHER PUBLICATIONS

Anonymous: "Flex Ethernet Implementation Agreement", OIF Optical Internetworking Forum, Jun. 21, 2017 pp. 1-35, XP055459219.

(Continued)

*Primary Examiner* — Ayaz R Sheikh
*Assistant Examiner* — Louis Samara
(74) *Attorney, Agent, or Firm* — Womble Bond Dickinson (US) LLP (57) ABSTRACT

A data transmission method is disclosed. The method in the embodiments of the present disclosure includes: obtaining, by a sending apparatus, a code block set; determining, by the sending apparatus, whether the code block set includes an idle code block; if the code block set comprises an idle code block, generating, by the sending apparatus, a dedicated code block, where the dedicated code block includes an indication field and a data field, the data field is used to carry a service, the indication field carries indication information, and the indication information is used to indicate that the dedicated code block and indicate that the data field carries the service; replacing, by the sending apparatus, the idle code block with the dedicated code block to obtain a target code block set, and sending, by the sending apparatus, the target code block set.

20 Claims, 7 Drawing Sheets

(58) Field of Classification Search
CPC . H04L 43/0864; H04L 1/0008; H04L 49/352; H04L 1/0083; H04L 1/0085
See application file for complete search history.

(56) References Cited

U.S. PATENT DOCUMENTS

| | | | |
|---|---|---|---|
| 2010/0172248 A1 | 7/2010 | Shiraishi | |
| 2011/0013619 A1 | 1/2011 | Fourcand | |
| 2017/0005901 A1 | 1/2017 | Gareau | |
| 2017/0093757 A1* | 3/2017 | Gareau | H04L 49/35 |
| 2018/0076932 A1* | 3/2018 | Okada | H04L 49/15 |
| 2019/0190690 A1* | 6/2019 | Zhong | H04L 7/0008 |
| 2020/0220650 A1* | 7/2020 | Cheng | H04L 1/0008 |
| 2020/0295874 A1* | 9/2020 | Cheng | H04L 1/20 |

FOREIGN PATENT DOCUMENTS

| | | |
|---|---|---|
| CN | 101335750 A | 12/2008 |
| CN | 101631064 A | 1/2010 |
| CN | 103491386 A | 1/2014 |
| CN | 106411454 A | 2/2017 |
| CN | 107438029 A | 12/2017 |
| JP | 2009232193 A | 10/2009 |
| WO | 2017070851 A1 | 5/2017 |
| WO | WO-2017070851 A1 * | 5/2017 |

OTHER PUBLICATIONS

IEEE 802.3—2015_Section1-6,IEEE Standard for Ethernet,IEEE Std 802.3—2015(Revision of IEEE Std 802.3—2012), dated Sep. 3, 2015.

Flex Ethernet, Implementation Agreement, IA # OIF-FLEXE-01.0, Mar. 2016. 31 pages.

* cited by examiner

| 1 | 0 | 0x4B | D1 | D2 | D3 | 0xF | 0x000_0000 | | | |
| 1 | 0 | 0x4B | D1 | D2 | D3 | 0xF | D4 | D5 | D6 | D7 |

FIG. 6

|  | 7E | FF | 03 | Protocol | Information | FCS | 7E |
| --- | --- | --- | --- | --- | --- | --- | --- |
| Byte | 1 | 1 | 1 | 2 | <=1500 | 2 | 1 |

DATA TRANSMISSION METHOD, SENDING APPARATUS, AND RECEIVING APPARATUS

CROSS-REFERENCE TO RELATED APPLICATIONS

This application is a continuation of International Application No. PCT/CN2018/113590, filed on Nov. 2, 2018, which claims priority to Chinese Patent Application No. 201711426203.7, filed on Dec. 25, 2017, The disclosures of the aforementioned applications are hereby incorporated by reference in their entireties.

TECHNICAL FIELD

The present disclosure relates to the communications field, and in particular, to a data transmission method, a sending apparatus and a receiving apparatus.

BACKGROUND 802.3 Ethernet related standards defined by the IEEE are widely used in the industry. However, with development of technologies, an Ethernet interface more deviate from an actual application requirement. For example, if a 50 Gb/s service is carried over a 100 gigabit Ethernet (GE) port, bandwidth resources are wasted. However, there may be no corresponding Ethernet standard to carry a 200 Gb/s service. Because of this, currently, a flexible Ethernet (FelxE) standard is proposed. For a 100 GE physical (PHY) layer interface, slots are divided based on a time division multiplexing manner. One period includes 20 slots, each slot carries one 64B/66B code block. A bandwidth of each slot is 5 Gbps.

The bandwidth of each slot divided by the FelxE is exclusively occupied by a transmitted service during transmission. If a slot is currently idle, bandwidth resources are also wasted. To avoid this phenomenon, in the prior art, when 20 64B/66B code blocks of one period include at least two idle code blocks, the first idle code block in a same time period is replaced with an indication code block, and the remaining idle code blocks are replaced with service code blocks of a best-effort (BE) service.

In this solution, one idle code block needs to be replaced with an indication code block in one period, to indicate all replaced code blocks in the period. However, if the indication code block has an error during transmission, a receiving apparatus cannot identify the replaced code blocks in the period when receiving data. It can be learned that a replacement manner of the idle code block has relatively high dependency on the indication code block, and a transmission error of the indication code block may affect identification of another replaced code block by the receiving apparatus and extraction by the receiving apparatus in a same period, where the replaced code block is normally transmitted, causing relatively poor overall stability of network transmission.

SUMMARY

Embodiments of the present disclosure provide a data transmission method for improving overall stability of network transmission.

In view of this, a first aspect of the embodiments of the present disclosure provides a data transmission method, including:

obtaining, by a sending apparatus, a code block set;
determining, by the sending apparatus, whether the code block set includes an idle code block;
if the code block set includes an idle code block, generating, by the sending apparatus, a dedicated code block, where the dedicated code block includes an indication field and a data field, the data field is used to carry a service, the indication field carries indication information, and the indication information is used to indicate that the dedicated code block and indicate that the data field carries the service;
replacing, by the sending apparatus, the idle code block with the dedicated code block to obtain a target code block set; and
sending, by the sending apparatus, the target code block set.

In this embodiment of the present disclosure, processing on the code block set by the sending apparatus may be implemented at a PHY layer.

The code block set in this embodiment of the present disclosure may be a segment of consecutive code blocks on a communications interface, or may be a FlexE frame applied to FlexE.

The dedicated code block in this embodiment of the present disclosure is different from an OH code block set and another data code block that are in the FlexE frame. The indication field of the dedicated code block may uniquely distinguish the dedicated code block and indicate that the data field of the dedicated code block carries the service.

With reference to the first aspect of the embodiments of the present disclosure, in a first implementation of the first aspect of the embodiments of the present disclosure, the service includes a BE service or an OH service.

With reference to the first implementation of the first aspect of the embodiments of the present disclosure, in a second implementation of the first aspect of the embodiments of the present disclosure, the service is the BE service; and the generating, by the sending apparatus, the dedicated code block includes:

determining, by the sending apparatus, that the $0^{th}$ to $7^{th}$ bits bits and/or $32^{nd}$ to $35^{th}$ bits of the dedicated code block are the indication field;

determining, by the sending apparatus, that the $8^{th}$ to $31^{st}$ bits and/or $36^{th}$ to $63^{rd}$ bits of the dedicated code block are the data field; and encapsulating, by the sending apparatus, the BE service into the data field.

With reference to the first implementation of the first aspect of the embodiments of the present disclosure, in a third implementation of the first aspect of the embodiments of the present disclosure, the service is the OH service; and the generating, by the sending apparatus, the dedicated code block includes:

determining, by the sending apparatus, that the $0^{th}$ to $7^{th}$ bits bits and/or $32^{nd}$ to $35^{th}$ bits of the dedicated code block are the indication field;

determining, by the sending apparatus, that the $8^{th}$ to $31^{st}$ bits and/or $36^{th}$ to $63^{rd}$ bits of the dedicated code block are the data field; and encapsulating, by the sending apparatus, the OH service into the data field.

In this embodiment of the present disclosure, the OH service encapsulated in the dedicated code block is a part of the OH service that needs to be carried and that is determined by the sending apparatus.

With reference to the first aspect of the embodiments of the present disclosure, or the first implementation of the first aspect, or the second implementation of the first aspect, or the third implementation of the first aspect, in a fourth implementation of the first aspect of the embodiments of the present disclosure, before the generating, by the sending apparatus, a dedicated code block, the method further includes:

determining, by the sending apparatus, the service that needs to be added to the dedicated code block.

With reference to the third implementation of the first aspect of the embodiments of the present disclosure, in a fifth implementation of the first aspect of the embodiments of the present disclosure, after the obtaining, by a sending apparatus, a code block set, and before the replacing, by the sending apparatus, the idle code block with the dedicated code block to obtain a target code block set, the method further includes:

encapsulating, by the sending apparatus, the OH service into a management channel, where the code block set includes the management channel.

In this embodiment of the present disclosure, the management channel is reserved for carrying management information, and the OH service encapsulated in the management channel is another part of the OH service other than the OH service encapsulated in the dedicated code block in the OH service that is determined and needs to be carried by the sending apparatus.

In the embodiments of the present disclosure, the sending apparatus obtains the code block set. When the code block set includes the idle code block, the sending apparatus generates the dedicated code block, where the dedicated code block includes the indication field and the data field. The data field is used to carry the service, and the indication field carries the indication information. The indication information is used to indicate that the dedicated code block and indicate that the data field carries the service. Further, the sending apparatus replaces the idle code block with the dedicated code block to obtain the target code block set, and sends the target code block set. It can be learned that each dedicated code block in the code block set in this embodiment not only has an identification function, but also may carry data information. Even if there is a dedicated code block with a transmission error in the code block set, identification of another normally transmitted dedicated code block by the receiving apparatus and extraction by the receiving apparatus cannot be affected, improving overall stability of network transmission.

A second aspect of the embodiments of the present disclosure provides a data transmission method, including:

receiving, by a receiving apparatus, a code block set sent by a sending apparatus;

determining, by the receiving apparatus, whether the code block set includes a dedicated code block, where the dedicated code block includes an indication field and a data field, the data field is used to carry a service, the indication field carries indication information, and the indication information is used to indicate that the dedicated code block and indicate that the data field carries the service;

if the code block set includes a dedicated code block, extracting, by the receiving apparatus, the service; and replacing, by the receiving apparatus, the dedicated code block with an idle code block to obtain a target code block set.

In this embodiment of the present disclosure, processing on the code block set by the receiving apparatus may be implemented at a PHY layer.

In this embodiment of the present disclosure, the code block set received by the receiving apparatus from another sending apparatus may also be a segment of consecutive code blocks on a communications interface, or may be a FlexE frame applied to FlexE. After the receiving apparatus replaces the dedicated code block with the idle code block to obtain the target code block set, the receiving apparatus sends the target code block set out through a communications interface.

It may be understood that the receiving apparatus may distinguish the dedicated code block by using the indication field in a code block and the indication information in the indication field.

With reference to the second aspect of the embodiments of the present disclosure, in a first implementation of the second aspect of the embodiments of the present disclosure, the service includes a BE service or an OH service.

With reference to the first implementation of the second aspect of the embodiments of the present disclosure, in a second implementation of the second aspect of the embodiments of the present disclosure, the service is the BE service; and the extracting, by the receiving apparatus, the service includes:

determining, by the receiving apparatus, that the $0^{th}$ to $7^{th}$ bits bits and/or $32^{nd}$ to $35^{th}$ bits of the dedicated code block are the indication field;

determining, by the receiving apparatus, that the $8^{th}$ to $31^{st}$ bits and/or $36^{th}$ to $63^{rd}$ bits of the dedicated code block are the data field; and extracting, by the receiving apparatus, the BE service from the data field.

With reference to the first implementation of the second aspect of the embodiments of the present disclosure, in a third implementation of the second aspect of the embodiments of the present disclosure, the service is the OH service; and the extracting, by the receiving apparatus, the service includes:

determining, by the receiving apparatus, that the $0^{th}$ to $7^{th}$ bits bits and/or $32^{nd}$ to $35^{th}$ bits of the dedicated code block are the indication field;

determining, by the receiving apparatus, that the $8^{th}$ to $31^{st}$ bits and/or $36^{th}$ to $63^{rd}$ bits of the dedicated code block are the data field; and extracting, by the receiving apparatus, the OH service from the data field.

In this embodiment of the present disclosure, in addition to extracting the OH service from the data field of the dedicated code block, the receiving apparatus may further extract another part of the OH service from a management channel.

In the embodiments of the present disclosure, the receiving apparatus receives the code block set sent by the sending apparatus. Then the receiving apparatus determines whether the code block set includes the dedicated code block, where the dedicated code block includes the indication field and the data field. The data field is used to carry the service, and the indication field carries the indication information. The indication information is used to indicate that the dedicated code block and indicate that the data field carries the service. When the code block set includes the dedicated code block, the receiving apparatus extracts the service, and replaces the dedicated code block with the idle code block to obtain the target code block set. It can be learned that the dedicated code block in the code block set in this embodiment not only has an identification function, but also may carry data information. For the receiving apparatus, even if there is a dedicated code block with a transmission error in the code block set, identification of another normally transmitted dedicated code block and service extraction cannot be affected, improving overall stability of network transmission.

A third aspect of the embodiments of the present disclosure provides a sending apparatus, including:

an obtaining unit, configured to obtain a code block set;

a judging unit, configured to determine whether the code block set includes an idle code block;

a generating unit, configured to: when the code block set includes the idle code block, generate a dedicated code block, where the dedicated code block includes an indication field and a data field, the data field is used to carry a service, the indication field carries indication information, and the indication information is used to indicate that the dedicated code block and indicate that the data field carries the service;

a replacement unit, configured to replace the idle code block with the dedicated code block to obtain a target code block set; and a sending unit, configured to send the target code block set.

With reference to the third aspect of the embodiments of the present disclosure, in a first implementation of the third aspect of the embodiments of the present disclosure, the service includes a best-effort BE service or an overhead OH service.

With reference to the first implementation of the third aspect of the embodiments of the present disclosure, in a second implementation of the third aspect of the embodiments of the present disclosure, the service is the BE service; and the generating unit is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and encapsulate the BE service into the data field.

With reference to the first implementation of the third aspect of the embodiments of the present disclosure, in a third implementation of the third aspect of the embodiments of the present disclosure, the service is the OH service; and the generating unit is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and encapsulate the OH service into the data field.

With reference to the third aspect of the embodiments of the present disclosure, or the first implementation of the third aspect, or the second implementation of the third aspect, or the third implementation of the third aspect, in a fourth implementation of the third aspect of the embodiments of the present disclosure, the sending apparatus further includes:

a determining unit, configured to determine the service that needs to be added to the dedicated code block.

With reference to the third aspect of the embodiments of the present disclosure, or the first implementation of the third aspect, or the second implementation of the third aspect, or the third implementation of the third aspect, in a fifth implementation of the third aspect of the embodiments of the present disclosure, the sending apparatus further includes:

an encapsulating unit, configured to encapsulate the OH service into a management channel, where the OH service encapsulated in the management channel is another part of the OH service other than the OH service encapsulated in the dedicated code block in the OH service that needs to be added.

A fourth aspect of the embodiments of the present disclosure provides a receiving apparatus, including:

a receiving unit, configured to receive a code block set sent by a sending apparatus;

a judging unit, configured to determine whether the code block set includes a dedicated code block, where the dedicated code block includes an indication field and a data field, the data field is used to carry a service, the indication field carries indication information, and the indication information is used to indicate that the dedicated code block and indicate that the data field carries the service;

an extracting unit, configured to extract the service when the code block set includes a dedicated code block; and a replacement unit, configured to replace the dedicated code block to obtain a target code block set.

With reference to the fourth aspect of the embodiments of the present disclosure, in a first implementation of the fourth aspect of the embodiments of the present disclosure, the service includes a best-effort BE service or an overhead OH service.

With reference to the first implementation of the fourth aspect of the embodiments of the present disclosure, in a second implementation of the fourth aspect of the embodiments of the present disclosure, the service is the BE service; and the extracting unit is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and extract the BE service from the data field.

With reference to the first implementation of the fourth aspect of the embodiments of the present disclosure, in a third implementation of the fourth aspect of the embodiments of the present disclosure, the service is the OH service; and the extracting unit is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and extract the OH service from the data field.

A fifth aspect of the embodiments of the present disclosure provides a sending apparatus, including:

a processor, a memory, a bus, and an input/output interface, where the memory stores program code; and when invoking the program code in the memory, the processor performs the following operations:

obtaining a code block set;

determining whether the code block set includes an idle code block;

if the code block set includes an idle code block, generating a dedicated code block, where the dedicated code block includes an indication field and a data field, the data field is used to carry a service, the indication field carries indication information, and the indication information is used to indicate that the dedicated code block and indicate that the data field carries the service;

replacing the idle code block with the dedicated code block to obtain a target code block set; and sending the target code block set.

A sixth aspect of the embodiments of the present disclosure provides a receiving apparatus, including:

a processor, a memory, a bus, and an input/output interface, where the memory stores program code; and when invoking the program code in the memory, the processor performs the following operations:

receiving a code block set sent by a sending apparatus;

determining whether the code block set includes a dedicated code block, where the dedicated code block includes an indication field and a data field, where the data field is used to carry a service, the indication field carries indication information, and the indication information is used to indicate that the dedicated code block and indicate that the data field carries the service;

if the code block set includes a dedicated code block, extracting the service; and replacing the dedicated code block with an idle code block to obtain a target code block set.

A seventh aspect of the embodiments of the present disclosure provides a computer readable storage medium, including an instruction. When the instruction is run on a computer, the computer is enabled to perform a process in the data transmission method according to the first aspect or the second aspect.

An eighth aspect of the embodiments of the present disclosure provides a computer program product that includes an instruction. When the computer program product is run on a computer, the computer is enabled to perform a process in the data transmission method according to the first aspect or the second aspect.

It can be learned from the foregoing technical solutions that, the embodiments of the present disclosure have the following advantages:

In the embodiments of the present disclosure, the sending apparatus obtains the code block set. When the code block set includes the idle code block, the sending apparatus generates the dedicated code block, where the dedicated code block includes the indication field and the data field. The data field is used to carry the service, and the indication field carries the indication information. The indication information is used to indicate that the dedicated code block and indicate that the data field carries the service. Further, the sending apparatus replaces the idle code block with the dedicated code block to obtain the target code block set, and sends the target code block set. It can be learned that each dedicated code block in the code block set in the embodiments not only has an identification function, but also may carry data information. Even if there is a dedicated code block with a transmission error in the code block set, identification of another normally transmitted dedicated code block by the receiving apparatus and extraction by the receiving apparatus cannot be affected, improving overall stability of network transmission.

DESCRIPTION OF EMBODIMENTS

Embodiments of the present disclosure provide a data transmission method for improving overall stability of network transmission.

The embodiments of the present disclosure may be applied to FlexE. The FlexE supports binding of a plurality of Ethernet interfaces into one link group, to support a media access control (MAC) service with a rate greater than a single Ethernet interface rate, and allocates a slot to a service to support a MAC service with a rate lower than link group bandwidth or less than single Ethernet interface bandwidth. In addition, a slot may be allocated to the service to support transmission of a plurality of MAC services in the link group at the same time.

Figure 1:
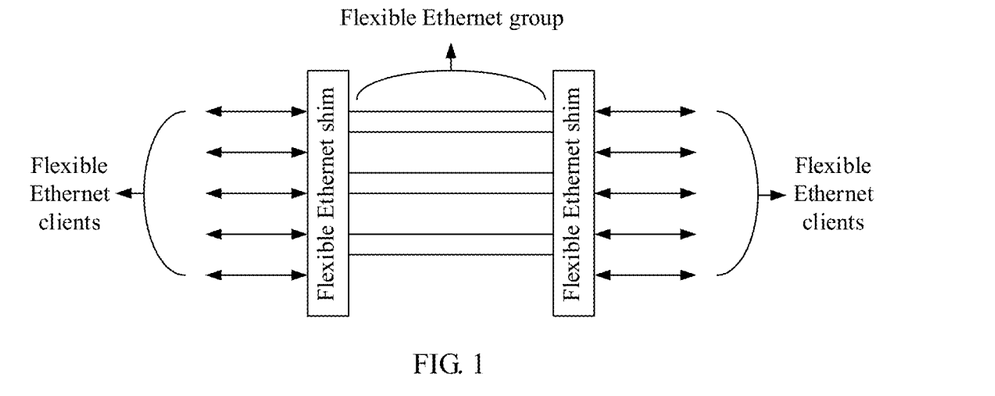
FIG. 1 is an overall architectural diagram of FlexE.

An overall architecture of FlexE is shown in FIG. 1. A flexible Ethernet group (FlexE Group) is formed by bonding 1 to n Ethernet physical (PHY) layers, flexible Ethernet (FlexE) clients are MAC-based Ethernet data streams, and a flexible Ethernet (FlexE) slim has a multiplexing function in a transmission direction, to map data of the FlexE clients to the FlexE group. Inversely, the flexible Ethernet slim has a demultiplexing function in a receive direction, to demap the data from the FlexE group.

Figure 2:
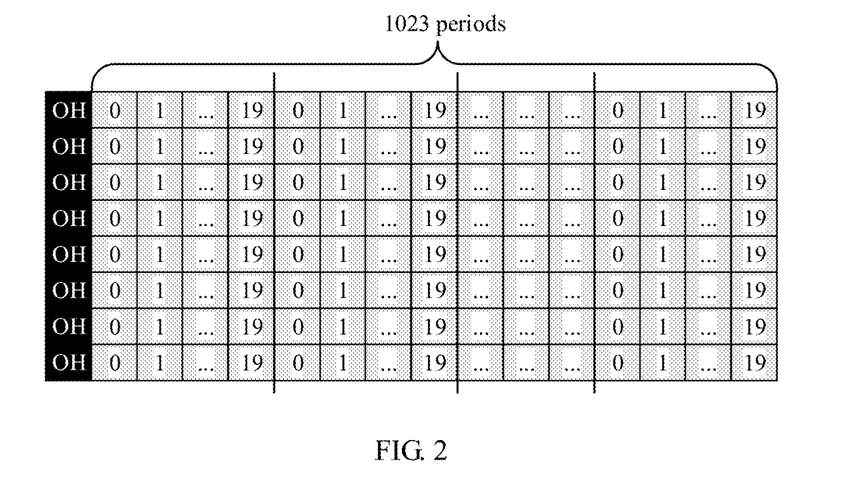
FIG. 2 is a frame format diagram of a FlexE frame.

The FlexE constructs a fixed frame format for physical interface transmission, and performs slot division based on time division multiplexing. The frame format in the FlexE is shown in FIG. 2. For a 100 GE PHY interface, a data code block stream includes 64B/66B code blocks. Every 20 64B/66B code blocks are a period, and the 20 64B/66B code blocks respectively correspond to different slots. Data on each PHY in the FlexE is aligned by periodically inserting an overhead (OH) code block. Specifically, one 66B OH code block is inserted every 1023×20 64B/66B code blocks, and eight OH code blocks and 1023×20 64B/66B code blocks jointly form an FlexE frame, where several OH code blocks in the eight OH code blocks of each FlexE frame may be further extracted and defined as a management channel.

64B/66B encoding encodes 64-bit data or control information into a 66-bit block for transmission. First two bits of the 66-bit block indicate a synchronization header which is mainly used for data alignment and synchronization. The synchronization header has two types: "01" and "10". "01" indicates that subsequent 64 bits are all data, and "10" indicates that the subsequent 64 bits are a combination of data and control information.

Figure 3:
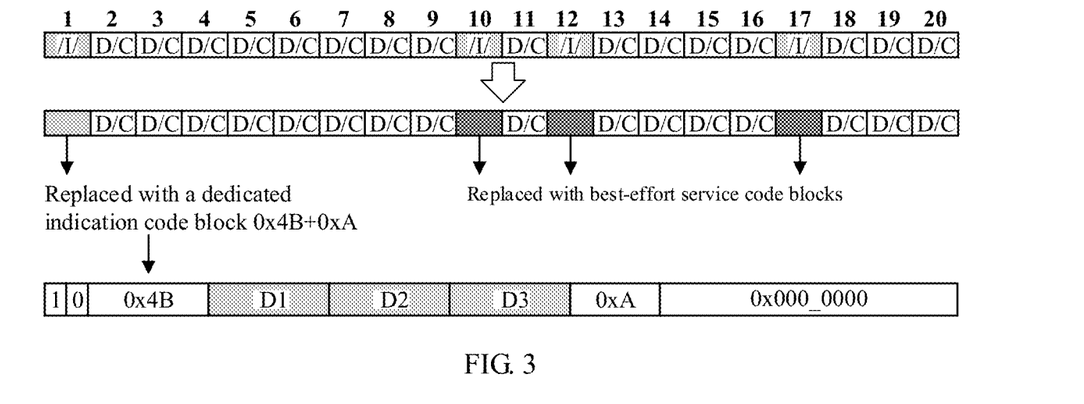
FIG. 3 is a code block format diagram of a dedicated indication code block in the prior art.

The 20 64B/66B code blocks in each period may include an idle code block not carrying a service. In the prior art, as shown in FIG. 3, when there are at least two idle code blocks in a period, a first idle code block in the period is replaced with an indication code block 0x4B+0xA, corresponding to the first bit in FIG. 3. Other idle code blocks are replaced with BE service code blocks, corresponding to the $10^{th}$ bit, $12^{th}$ bit, and $17^{th}$ bit in FIG. 3. 20 bits preceding three bytes D1 to D3, three indication code blocks, are used to indicate a code block replacement situation in the period, corresponding to a case shown in FIG. 3. The 20 bits preceding D1 to D3 should be (1000 0000 0101 0000 1000), where 1 indicates a replaced code block in the period, and 0 indicates that a code block in the period is an original code block (not replaced).

This solution can only work in a scenario in which at least two idle code blocks are included in a same period, and a transmission error of the indication code block may affect identification of another replaced and normally transmitted code block by the receiving apparatus and extraction by the receiving apparatus in the same period, causing relatively poor overall stability of network transmission.

It should be noted that the data transmission method described in the embodiments of the present disclosure may be applied to a network device, for example, a switch or a router. It may be understood that an apparatus for implementing the data transmission method in the embodiments of the present disclosure is an apparatus for both receiving and sending, and has both a function of sending data and a function of receiving data. When sending the data, the apparatus may be considered as a sending apparatus, and may be considered as a receiving apparatus when receiving the data.

Therefore, the embodiments of the present disclosure provide a data transmission method to resolve the foregoing problem. For ease of understanding, the following describes a specific process in the embodiments of the present disclosure.

Figure 4:
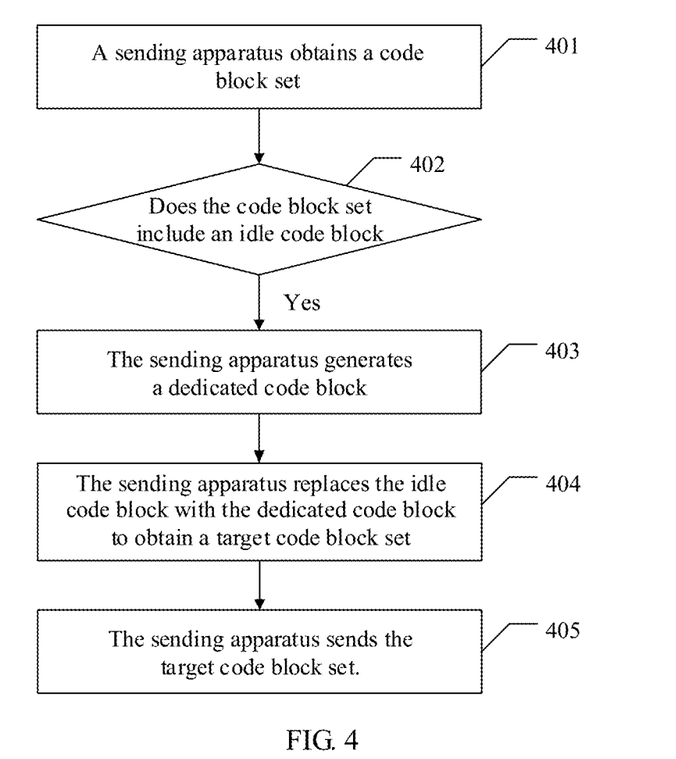
FIG. 4 is a schematic diagram of an embodiment of a data transmission method according to the present disclosure.

Referring to FIG. 4, an embodiment of a data transmission method in the embodiments of the present disclosure includes the following operations.

Operation 401. A sending apparatus obtains a code block set.

The sending apparatus receives the code block set through a communications interface. Specifically, the code block set may be a segment of consecutive code blocks on the communications interface, or may be a FlexE frame. As shown in FIG. 2, the FlexE frame includes an OH code block set shown in the first column in the frame structure and the remaining data code blocks. One or more OH code blocks in the OH code block set are used as a management channel, and the management channel is reserved for carrying management information, for example, an OH service. Each OH code block uses "01" as a synchronization header, and includes 8 available bytes of total 64 bits.

Operation 402. The sending apparatus determines whether the code block set includes an idle code block, and if the code block set includes an idle code block, performs operation 403.

After receiving the code block set, the sending apparatus needs to determine whether the code block set includes the idle code block. It may be understood that the idle code block is a code block that does not carry data information.

Operation 403. The sending apparatus generates a dedicated code block.

In this embodiment, when the code block set includes the idle code block, the sending apparatus generates the dedicated code block. Specifically, the dedicated code block includes a synchronization header, an indication field and a data field. In addition to the synchronization header occupying first two bits of the dedicated code block, the indication field and the data field occupy subsequent 64 bits of the dedicated code block. The data field is used to carry a service, and the indication field carries indication information. The indication information is used to indicate the dedicated code block and indicate that the data field of the dedicated code block carries the service.

The dedicated code block in this embodiment of the present disclosure is different from the OH code block set and another data code block in the FlexE frame, and the indication field of the dedicated code block may uniquely distinguish the dedicated code block and indicate that the data field of the dedicated code block carries the service.

It may be understood that, a receiving apparatus may identify, based on the indication field of the dedicated code block, that the dedicated code block is a code block that replaces the idle code block and carries the service.

Operation 404. The sending apparatus replaces the idle code block with the dedicated code block to obtain a target code block set.

After the sending apparatus generates the dedicated code block carrying the service, the sending apparatus further replaces the idle code block with the dedicated code block to obtain the target code block set. It may be understood that if the code block set includes a plurality of idle code blocks, the sending apparatus replaces the idle code blocks in order based on a sending sequence of code blocks in the code block set.

Operation 405. The sending apparatus sends the target code block set.

In this embodiment of the present disclosure, after completing replacing the idle code block with the dedicated code block, the sending apparatus may send obtained target code block set out through an interface.

In this embodiment of the present disclosure, the sending apparatus obtains the code block set. When the code block set includes the idle code block, the sending apparatus generates the dedicated code block, where the dedicated code block includes the indication field and the data field. The data field is used to carry the service, and the indication field carries indication information. The indication information is used to indicate that the dedicated code block and indicate that the data field carries the service. Further, the sending apparatus replaces the idle code block with the dedicated code block to obtain the target code block set, and sends the target code block set. It can be learned that each dedicated code block in the code block set in this embodiment not only has an identification function, but also may carry data information. Even if there is a dedicated code block with a transmission error in the code block set, identification of another normally transmitted dedicated code block by the receiving apparatus and extraction by the receiving apparatus are not be affected, improving overall stability of network transmission.

The embodiments of the present disclosure may be specifically divided into two solutions, which are described separately below.

Solution 1: A dedicated code block is defined. The dedicated code block includes an indication field and a data field. The indication field is used to indicate the dedicated code block, and the data field is used to carry a BE service. The sending apparatus replaces an idle code block with the dedicated code block carrying the BE service.

Figure 5:
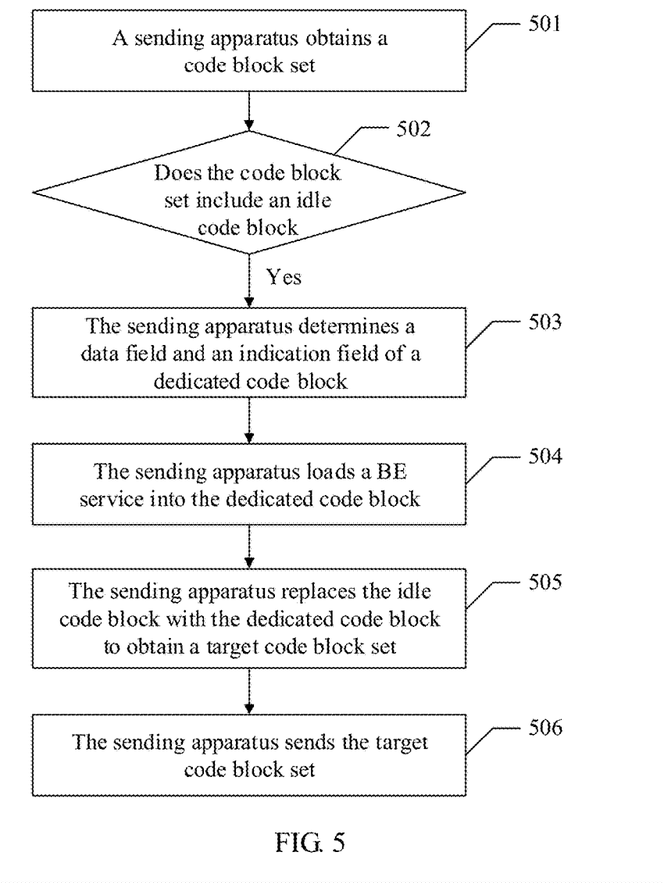
FIG. 5 is a schematic diagram of another embodiment of a data transmission method according to the present disclosure.

Referring to FIG. 5, an embodiment of a data transmission method in the embodiments of the present disclosure includes the following operations.

Operation 501. A sending apparatus obtains a code block set.

The sending apparatus receives the code block set through a communications interface. Specifically, the code block set may be a segment of consecutive code blocks on the communications interface, or may be a FlexE frame. As shown in FIG. 2, the FlexE frame includes the OH code block set shown in the first column in the frame structure and the remaining data code blocks. One or more OH code blocks in the OH code block set are used as a management channel, and the management channel is reserved for carrying management information, for example, an OH service. Each OH code block uses "01" as a synchronization header, and includes 8 available bytes of total 64 bits.

Operation 502. The sending apparatus determines whether the code block set includes an idle code block, and if the code block set includes an idle code block, performs operation 503.

After receiving the code block set, the sending apparatus needs to determine whether the code block set includes an idle code block. It may be understood that the idle code block is a code block that does not carry data information.

Operation 503. The sending apparatus determines a data field and an indication field of a dedicated code block.

In this embodiment, when the code block set includes the idle code block, the sending apparatus determines the data field and the indication field of the dedicated code block. Specifically, the dedicated code block may be shown in FIG. 6. The dedicated code block includes a synchronization header, the indication field, and the data field. In addition to the synchronization header occupying first two bits of the dedicated code block, the indication field and the data field occupy subsequent 64 bits of the dedicated code block. The indication field may be defined in a plurality of manners, for example, the $0^{th}$ to $7^{th}$ bits of the dedicated code block are defined as the indication field, or the $32^{nd}$ to $35^{th}$ bits of the dedicated code block may be defined as the indication field; or the $0^{th}$ to $7^{th}$ bits and the $32^{nd}$ to $35^{th}$ bits of the dedicated code block may be jointly defined as the indication field, that is, an area shown by 0x4B in FIG. 6, an area shown by 0xF, or an area shown in 0x4B+0xF. The data field of the dedicated code block may also be defined in a plurality of manners. For example, the $8^{th}$ to $31^{st}$ bits of the dedicated code block are defined as the data field; or the $36^{th}$ to $63^{rd}$ bits of the dedicated code block may be defined as the data field; or the $8^{th}$ to $31^{st}$ bits and the $36^{th}$ to $63^{rd}$ bits of the dedicated code block may be jointly defined as the data field, that is, may be an area shown by D1 to D3 in FIG. 6 or an area shown by D4 to D7, or an area shown by D1 to D7.

Figure 6:
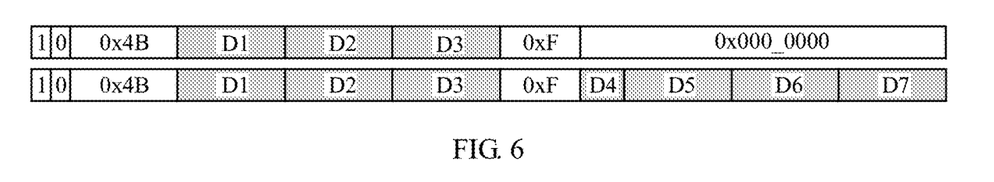
FIG. 6 is a code block format diagram of a dedicated code block in the present disclosure.

The dedicated code block in the embodiments of the present disclosure is different from the OH code block set and another data code block in the FlexE frame, and the indication field of the dedicated code block may uniquely distinguish the dedicated code block and indicate that the data field of the dedicated code block carries a service.

It may be understood that, the receiving apparatus may identify, based on the indication field of the dedicated code block, that the dedicated code block is a code block that replaces the idle code block and carries the service.

It should be noted that the indication field carries indication information, for example, 0x4B and 0xF. The indication information carried in the indication field may be in another form, for example, may be that the indication information corresponding to the $0^{th}$ to $7^{th}$ bits is 0x4B, the indication information corresponding to the $32^{nd}$ to $35^{th}$ bits is 0xF, 0xA, 0x9, or 0x3, or the indication information corresponding to the $0^{th}$ to $7^{th}$ bits is 0x00. This is not specifically limited herein.

Operation 504. The sending apparatus loads a BE service into the dedicated code block.

In this embodiment, the sending apparatus may load the BE service that needs to be carried into the data field of the dedicated code block. Specifically, the sending apparatus may encapsulate the BE service by using a point-to-point protocol (PPP) and map the BE service byte by byte to the data field of the dedicated code block.

Figure 7:
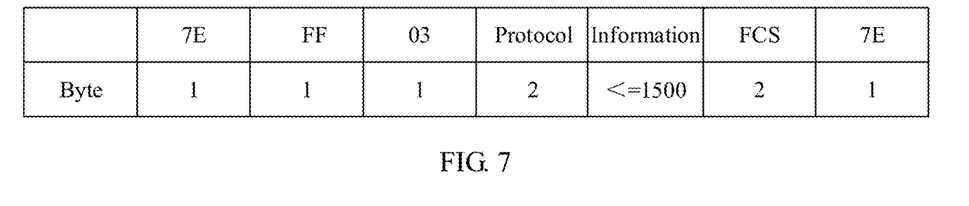
FIG. 7 is a frame format diagram of a PPP frame.

FIG. 7 shows a PPP frame format. In the PPP, 0x7E is used as a start and an end of a frame. The start byte 0x7E is closely followed by an address byte (0xFF) and a control byte (0x03). Subsequent protocol field is stuffed with two bytes, and an information field is used to carry the BE service that needs to be transmitted. A frame check field (FCS) also includes two bytes, and is used to check the information field. By using a byte-based frame delimitation mode of the PPP protocol, 0x7E is used to identify the start and end of the frame, and the BE service is encapsulated into the information field.

It should be noted that, in addition to encapsulating the BE service by using the PPP protocol, the sending apparatus may further use another protocol, for example, a high-level data link control (HDLC) protocol and a generic framing procedure (GFP) protocol. This is not specifically limited herein.

Operation 505. The sending apparatus replaces the idle code block with the dedicated code block to obtain a target code block set.

After the sending apparatus loads the BE service into the dedicated code block, the sending apparatus further replaces the idle code block with the dedicated code block to obtain the target code block set. It may be understood that if the code block set includes a plurality of idle code blocks, the sending apparatus replaces the idle code blocks in order based on a sending sequence of code blocks in the code block set.

Operation 506. The sending apparatus sends the target code block set.

In this embodiment, after completing replacing the idle code block with the dedicated code block, the sending apparatus may send obtained target code block set out through an interface.

In this embodiment of the present disclosure, the sending apparatus obtains the code block set. When the code block set includes the idle code block, the sending apparatus generates the dedicated code block, where the dedicated code block includes the indication field and the data field. The data field is used to carry the BE service, and the indication field carries the indication information. The indication information is used to indicate that the dedicated code block and indicate that the data field carries the BE service. Further, the sending apparatus replaces the idle code block with the dedicated code block to obtain the target code block set, and sends the target code block set. It can be learned that each dedicated code block in the code block set in this embodiment not only has an identification function, but also may carry data information. Even if there is a dedicated code block with a transmission error in the code block set, identification of another normally transmitted dedicated code block by the receiving apparatus and extraction by the receiving apparatus are not be affected, improving overall stability of network transmission.

Solution 2: A dedicated code block is defined. The dedicated code block includes an indication field and a data field. The indication field is used to indicate a dedicated code block. The sending apparatus loads an OH service into the data field and a management channel of the dedicated code block, and replaces an idle code block with the dedicated code block, so that the dedicated code block and the management channel jointly carry the OH service.

Figure 8:
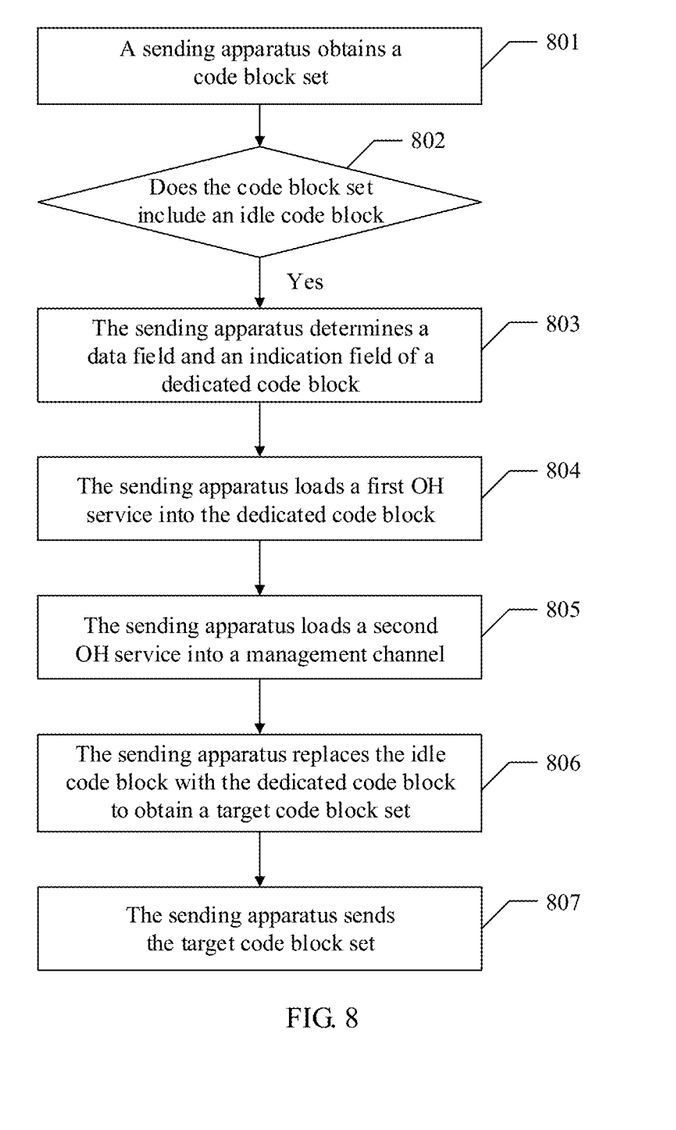
FIG. 8 is a schematic diagram of another embodiment of a data transmission method according to the present disclosure.

Referring to FIG. 8, another embodiment of a data transmission method in the embodiments of the present disclosure includes the following operations.

Operation 801. A sending apparatus obtains a code block set.

Operation 802. The sending apparatus determines whether the code block set includes an idle code block, and if the code block set includes an idle code block, performs operation 803.

Operation 803. The sending apparatus determines a data field and an indication field of a dedicated code block.

In this embodiment, operation 801 to operation 803 are similar to operation 501 to operation 503 in the embodiment shown in FIG. 5, and details are not described herein again.

Operation 804. The sending apparatus loads a first OH service into the dedicated code block.

In this embodiment, the sending apparatus loads the first OH service that needs to be carried into the data field of the dedicated code block. The first OH service is a part of an OH service that needs to be added by the sending apparatus. Specifically, the sending apparatus may encapsulate the first OH service by using a point-to-point protocol (PPP) and map the first OH service byte by byte to the data field of the dedicated code block.

FIG. 6 shows a PPP frame format. In the PPP, 0x7E is used as a start and an end of a frame. The start byte 0x7E is closely followed by an address byte (0xFF) and a control byte (0x03). Subsequent protocol field is stuffed with two bytes, and information field is used to carry the first OH service that needs to be transmitted. A frame check field (FCS) also includes two bytes, and is used to check the information field. The frame check field uses the 0x7E to identify the start and end of the frame by using a byte-based frame delimitation mode of the PPP protocol, and encapsulates the first OH service into the information field.

It should be noted that, in addition to encapsulating the first OH service by using the PPP protocol, the sending apparatus may further use another protocol, for example, a high-level data link control (HDLC) protocol and a generic framing procedure (GFP) protocol. This is not specifically limited herein.

Operation 805. The sending apparatus loads a second OH service into a management channel.

In this embodiment, the sending apparatus loads the second OH service that needs to be carried into the management channel. It may be understood that the sending apparatus may use the dedicated code block and the management channel to jointly carry the OH service. The second OH service is another part of the OH service other than the first OH service in the OH service that needs to be added.

Figure 9:
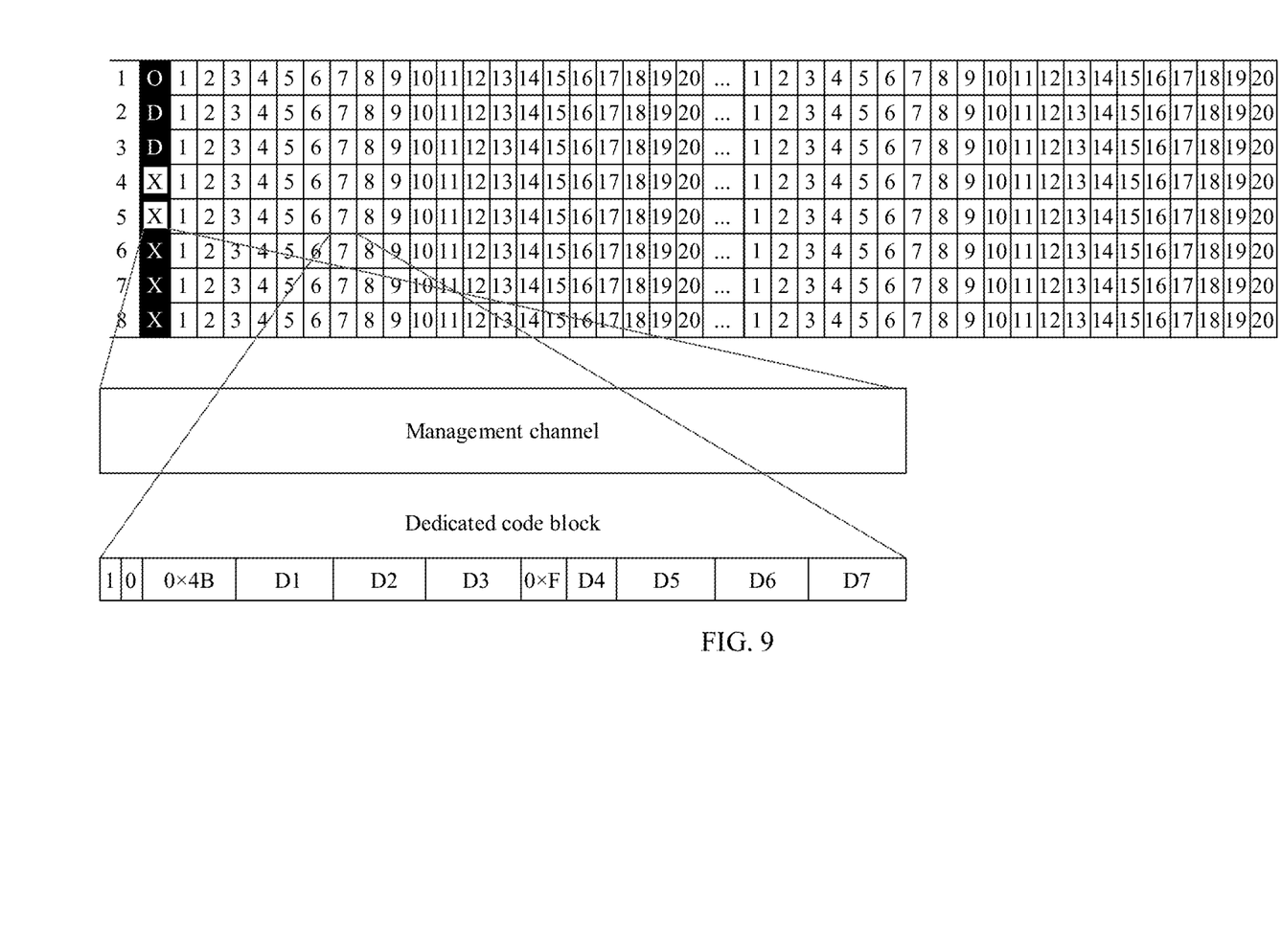
FIG. 9 is a schematic diagram of jointly carrying an OH service by a dedicated code block and a management channel according to the present disclosure.

Specifically, referring to FIG. 9, the first column of a code block set is an OH code block, where the fourth OH code block and the fifth OH code block are defined as a management channel, and the second OH service is loaded into the management channel. The management channel includes 132 bits. It may be understood that the management channel defined in this embodiment is only an example, and the management channel may also have another definition manner. For example, the management channel may also be defined as three OH code blocks, the sixth to eighth OH code blocks. This is not specifically limited herein.

It should be noted that the sending apparatus encapsulates the second OH service by using the PPP protocol and maps the second OH service byte by byte to the management channel. In addition to encapsulating the second OH service by using the PPP, the sending apparatus may also use another protocol, for example, an HDLC protocol and a GFP protocol. This is not specifically limited herein.

It should be noted that there is no fixed time sequence relationship between operation 804 and operation 805. Operation 804 may be performed first, or operation 805 may be performed first. Alternatively, operation 804 and operation 805 may be performed at the same time. This is not specifically limited herein.

Operation 806. The sending apparatus replaces the idle code block with the dedicated code block to obtain a target code block set.

Operation 807. The sending apparatus sends the target code block set.

In this embodiment, operation 806 and operation 807 are similar to operation 505 and operation 506 in the embodiment shown in FIG. 5, and details are not described herein again.

In this embodiment of the present disclosure, the sending apparatus obtains the code block set. When the code block set includes the idle code block, the sending apparatus generates the dedicated code block, where the dedicated code block includes the indication field and the data field. The data field is used to carry the first OH service, and the indication field carries indication information. The indication information is used to indicate that the dedicated code block and indicate that the data field carries the service. In addition, the sending apparatus further loads the second OH service into the management channel, that is, uses the dedicated code block and the management channel to jointly carry the OH service. When overall stability of network transmission is improved, the dedicated code block may further be used to carry a part of the OH service, and this provides extra bandwidth for the OH service.

The foregoing describes the embodiments of the present disclosure from a perspective of the sending apparatus. The following further describes the embodiments of the present disclosure from a perspective of a receiving apparatus.

Figure 10:
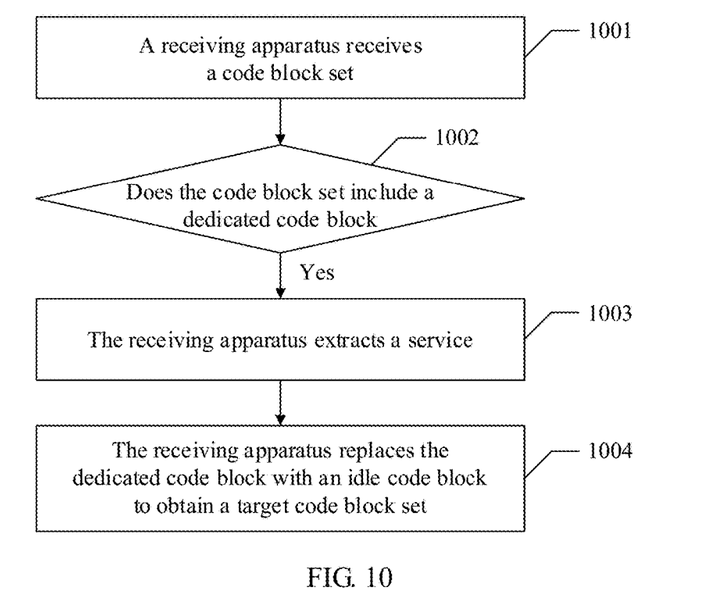
FIG. 10 is a schematic diagram of another embodiment of a data transmission method according to the present disclosure.

Referring to FIG. 10, another embodiment of a data transmission method in the embodiments of the present disclosure includes the following operations.

Operation 1001. A receiving apparatus receives a code block set.

In this embodiment of the present disclosure, the receiving apparatus receives the code block set sent by another device. Specifically, the code block set may be a segment of consecutive code blocks on a communications interface, or may be a FlexE frame. A description of the FlexE frame is similar to that of the FlexE frame in operation 401 in the embodiment shown in FIG. 4, and details are not described herein again.

Operation 1002. The receiving apparatus determines whether the code block set includes a dedicated code block, and if the code block set includes a dedicated code block, performs operation 1003.

After receiving the code block set, the receiving apparatus needs to determine whether the code block set includes the dedicated code block. A description of the dedicated code block is similar to that of the dedicated code block in operation 503 in the embodiment shown in FIG. 5, and details are not described herein again.

It may be understood that the receiving apparatus may identify the dedicated code block based on an indication field in the dedicated code block and indication information in the indication field.

It should be noted that if the code block set includes a plurality of dedicated code blocks, the receiving apparatus replaces the dedicated code block in order based on a sending sequence of code blocks in the code block set.

Operation 1003. The receiving apparatus extracts a service.

In this embodiment of the present disclosure, when the code block set includes the dedicated code block, the receiving apparatus extracts a corresponding service from the dedicated code block. Specifically, if the dedicated code block carries a BE service, the receiving apparatus extracts the BE service from a data field of the dedicated code block. If the dedicated code block carries a part of an OH service, the receiving apparatus extracts the OH service from the data field of the dedicated code block, and further needs to extract another part of the OH service from a management channel.

Operation 1004. The receiving apparatus replaces the dedicated code block with an idle code block to obtain a target code block set.

In this embodiment of the present disclosure, after the receiving apparatus extracts the service from the dedicated code block, the receiving apparatus replaces the dedicated code block with the idle code block to obtain the target code block set, that is, restores the dedicated code block to a previous idle code block, and then the receiving apparatus sends the target code block set out through the communications interface.

In this embodiment of the present disclosure, the receiving apparatus receives the code block set sent by a sending apparatus. Then the receiving apparatus determines whether the code block set includes the dedicated code block, where the dedicated code block includes the indication field and the data field. The data field is used to carry a service, and the indication field carries indication information. The indication information is used to indicate that the dedicated code block and indicate that the data field carries the service. When the code block set includes the dedicated code block, the receiving apparatus extracts the service; and replaces the dedicated code block with the idle code block to obtain the target code block set. It can be learned that the dedicated code block in the code block set in this embodiment not only has an identification function, but also may carry data information. For the receiving apparatus, even if there is a dedicated code block with a transmission error in the code block set, identification of another normally transmitted dedicated code block and service extraction are not affected, improving overall stability of network transmission.

The data transmission method in the embodiments of the present disclosure is described above, and a sending apparatus in the embodiments of the present disclosure is described below.

Figure 11:
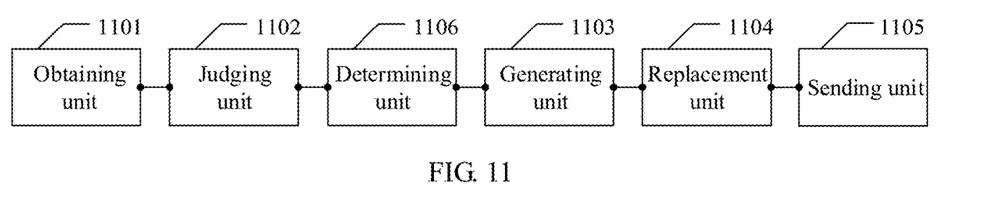
FIG. 11 is a schematic diagram of an embodiment of a sending apparatus according to the present disclosure.

Referring to FIG. 11, an embodiment of a sending apparatus in the embodiments of the present disclosure includes:

an obtaining unit 1101, configured to obtain a code block set;

a judging unit 1102, configured to determine whether the code block set includes an idle code block;

a generating unit 1103, configured to: when the code block set includes an idle code block, generate a dedicated code block, where the dedicated code block includes an indication field and a data field, the data field is used to carry a service, the indication field carries indication information, and the indication information is used to indicate that the dedicated code block and indicate that the data field carries the service;

a replacement unit 1104, configured to replace the idle code block with the dedicated code block to obtain a target code block set; and a sending unit 1105, configured to send the target code block set.

In this embodiment of the present disclosure, the sending apparatus further includes:

a determining unit 1106, configured to determine the service that needs to be added to the dedicated code block.

In this embodiment of the present disclosure, when the service that needs to be added is a BE service, the generating unit 1103 is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and encapsulate the BE service into the data field.

In this embodiment of the present disclosure, when the service that needs to be added is an OH service, the generating unit 1103 is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and encapsulate the OH service into the data field.

In this embodiment of the present disclosure, the obtaining unit 1101 obtains the code block set and the judging unit 1102 determines whether the code block set includes the idle code block. When the code block set includes the idle code block, the generating unit 1103 generates the dedicated code block, where the dedicated code block includes the indication field and the data field. The data field is used to carry the service, and the indication field carries the indication information. The indication information is used to indicate that the dedicated code block and indicate that the data field carries the service. Further, the replacement unit 1104 replaces the idle code block with the dedicated code block to obtain the target code block set, and the sending unit 1105 sends the target code block set. It can be learned that each dedicated code block in the code block set in this embodiment not only has an identification function, but also may carry data information. Even if there is a dedicated code block with a transmission error in the code block set, identification of another normally transmitted dedicated code block by the receiving apparatus and extraction by the receiving apparatus are not affected, improving overall stability of network transmission.

The sending apparatus in the embodiments of the present disclosure is described above, and a receiving apparatus in the embodiments of the present disclosure are described below.

Figure 12:
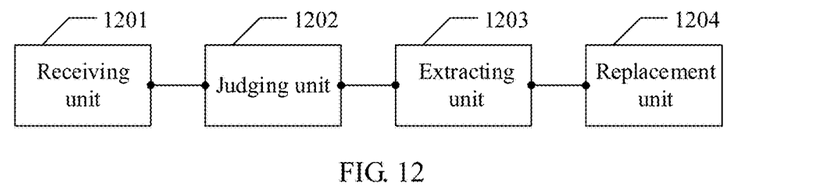
FIG. 12 is a schematic diagram of an embodiment of a receiving apparatus according to the present disclosure.

Referring to FIG. 12, an embodiment of a receiving apparatus in the embodiments of the present disclosure includes:

a receiving unit 1201, configured to receive a code block set sent by a sending apparatus;

a judging unit 1202, configured to determine whether the code block set includes a dedicated code block, where the dedicated code block includes an indication field and a data field, the data field is used to carry a service, the indication field carries indication information, and the indication information is used to indicate that the dedicated code block and indicate that the data field carries the service;

an extracting unit 1203, configured to extract the service when the code block set includes a dedicated code block; and a replacement unit 1204, configured to replace the dedicated code block to obtain a target code block set.

In this embodiment of the present disclosure, when the service that needs to be extracted is a BE service, the extracting unit 1203 is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and extract the BE service from the data field.

In this embodiment of the present disclosure, when the service that needs to be extracted is an OH service, the extracting unit 1203 is specifically configured to:

determine that the $0^{th}$ to $7^{th}$ bits bits and/or $32^{nd}$ to $35^{th}$ bits of the dedicated code block are the indication field; and determine that the $8^{th}$ to $31^{st}$ bits and/or $36^{th}$ to $63^{rd}$ bits are the data field; and extract the OH service from the data field.

In this embodiment of the present disclosure, the receiving unit 1201 receives the code block set sent by the sending apparatus. The judging unit 1202 determines whether the code block set includes the dedicated code block, where the dedicated code block includes the indication field and the data field, the data field is used to carry the service, and the indication field carries the indication information. The indication information is used to indicate that the dedicated code block and indicate that the data field carries the service. When the code block set includes the dedicated code block, the extracting unit 1203 extracts the service, and the replacement unit 1204 replaces the dedicated code block with the idle code block to obtain the target code block set. It can be learned that the dedicated code block in the code block set in this embodiment not only has an identification function, but also may carry data information. For the receiving apparatus, even if there is a dedicated code block with a transmission error in the code block set, identification of another normally transmitted dedicated code block and service extraction are not affected, improving overall stability of network transmission.

The foregoing describes the sending apparatus and the receiving apparatus in the embodiments of the present disclosure from a perspective of a modular function entity. The following describes a network device having a sending and receiving function in the embodiments of the present disclosure from a perspective of hardware processing.

The network device may be a provider (P) network node in the FlexE, or may be a provider edge PE) network node. When sending data, the network device may be considered as a sending apparatus in the embodiments of the present disclosure. When receiving data, the network device may be considered as a receiving apparatus in the embodiments of the present disclosure.

Figure 13:
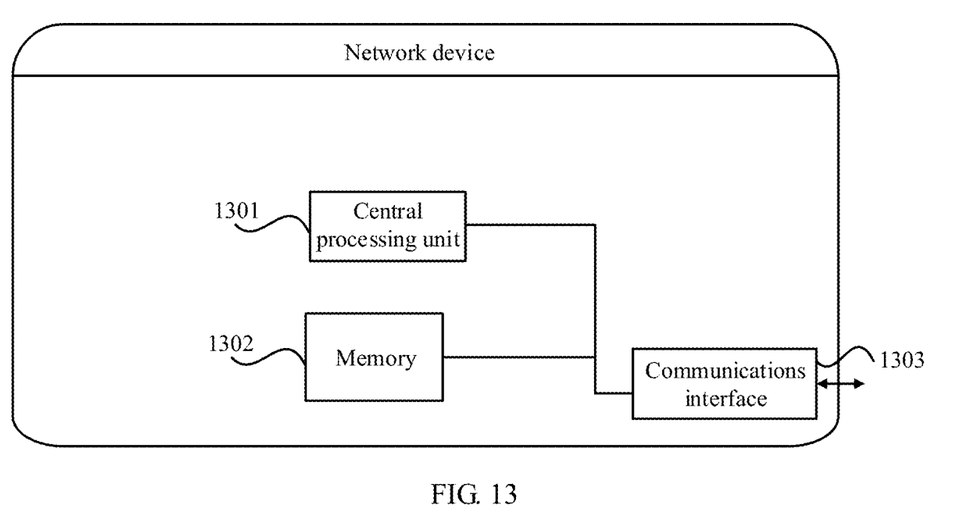
FIG. 13 is a schematic diagram of an embodiment of a network device according to the present disclosure.

Referring to FIG. 13, a network device in the present disclosure includes one or more central processing units 1301, a memory 1302, and a communications interface 1303. The central processing unit 1301, the memory 1302, and the communications interface 1303 are connected to each other by using a bus.

The memory 1302 may be a temporary storage or a persistent storage, and is configured to store related instructions and data. The communications interface 1303 is configured to receive and send data. Further, the central processing unit 1301 may be configured to: communicate with the memory 1302, and perform, on the network device, a series of instruction operations in the memory 1302.

In this embodiment, when the network device is used as a sending apparatus, the central processing unit 1301 reads program code stored in the memory 1302, and performs the following operations:

obtaining a code block set;

determining whether the code block set includes an idle code block;

if the code block set includes an idle code block, generating a dedicated code block, where the dedicated code block includes an indication field and a data field, the data field is used to carry a service, the indication field carries indication information, and the indication information is used to indicate that the dedicated code block and indicate that the data field carries the service;

replacing the idle code block with the dedicated code block to obtain a target code block set; and sending the target code block set through the communications interface 1303.

In this embodiment, when the network device is used as a receiving apparatus, the central processing unit 1301 reads program code stored in the memory 1302, and performs the following operations:

receiving a code block set through the communications interface 1303;

determining whether the code block set includes a dedicated code block, where the dedicated code block includes an indication field and a data field, the data field is used to carry a service, the indication field carries indication information, and the indication information is used to indicate that the dedicated code block and indicate that the data field carries the service;

if the code block set includes a dedicated code block, extracting the service; and replacing the dedicated code block with an idle code block to obtain a target code block set.

In this embodiment, division of specific functional modules in the central processing unit 1301 may be similar to division of the functional modules of units such as the obtaining unit, the judging unit, the generating unit, the replacement unit, the sending unit, and the extracting unit described in FIG. 11 and FIG. 12. Details are not described herein again.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A data transmission method, comprising:
   obtaining, by a sending apparatus, a code block set;
   determining, by the sending apparatus, whether the code block set comprises an idle code block;
   if the code block set comprises the idle code block, generating, by the sending apparatus, a dedicated code block, wherein the dedicated code block comprises an indication field and a data field, wherein the data field is used to carry a service, the indication field carries indication information, and the indication information is used to indicate that the dedicated code block and the data field carry the service, wherein the generating the dedicated code block comprises:
      determining, by the sending apparatus, that the $0^{th}$ to $7^{th}$ bits and/or $32^{nd}$ to $35^{th}$ bits of the dedicated code block is the indication field;
      determining, by the sending apparatus, that the $8^{th}$ to $31^{th}$ bits and/or $36^{th}$ to $63^{rd}$ bits of the dedicated code block is the data field; and
      encapsulating, by the sending apparatus, the service into the data field, wherein the service comprises an overhead (OH) service;
   replacing, by the sending apparatus, the idle code block with the dedicated code block to obtain a target code block set; and
   sending, by the sending apparatus, the target code block set.

2. The method according to claim 1, wherein the service comprises a best-effort (BE) service or an overhead (OH) service.

3. The method according to claim 2, wherein the service is the BE service; and
   the generating, by the sending apparatus, the dedicated code block comprises:
      determining, by the sending apparatus, that the $0^{th}$ to $7^{th}$ bits and/or $32^{nd}$ to $35^{th}$ bits of the dedicated code block are the indication field;
      determining, by the sending apparatus, that $8^{th}$ to $31^{st}$ bits and/or $36^{th}$ to $63^{rd}$ bits of the dedicated code block are the data field; and
      encapsulating, by the sending apparatus, the BE service into the data field.

4. The method according to claim 1, wherein before the generating, by the sending apparatus, the dedicated code block, the method further comprises:
   determining, by the sending apparatus, the service that needs to be added to the dedicated code block.

5. The method according to claim 1, wherein the code block set is a segment of consecutive code blocks on a communications interface or a flexible Ethernet (FlexE) frame.

6. The method according to claim 1, further comprising:
   after the obtaining, by the sending apparatus, the code block set, and before the replacing, by the sending apparatus, the idle code block with the dedicated code block to obtain a target code block set, encapsulating, by the sending apparatus, the service into a management channel, where the code block set includes the management channel.

7. The method according to claim 6, wherein the service encapsulated in the management channel is a part of the service other than the part of the service encapsulated in the dedicated code block.

8. A data transmission method, comprising:
   receiving, by a receiving apparatus, a code block set sent by a sending apparatus;
   determining, by the receiving apparatus, whether the code block set comprises a dedicated code block, wherein the dedicated code block comprises an indication field and a data field, the data field is used to carry a service, the indication field carries indication information, and the indication information is used to indicate that the dedicated code block and the data field carry the service;
   if the code block set comprises the dedicated code block, extracting, by the receiving apparatus, the service, including
      determining, by the receiving apparatus, that the $0^{th}$ to $7^{th}$ bits and/or $32^{nd}$ to $35^{th}$ bits of the dedicated code block is the indication field;
      determining, by the receiving apparatus, that the $8^{th}$ to $31^{st}$ bits and/or $36^{th}$ to $63^{rd}$ bits of the dedicated code block is the data field; and
      extracting, by the receiving apparatus, the service from the data field, wherein the service comprises an overhead (OH) service; and
   replacing, by the receiving apparatus, the dedicated code block with an idle code block to obtain a target code block set.

9. The method according to claim 8, wherein the service comprises a best-effort (BE) service or an overhead (OH) service.

10. The method according to claim 9, wherein the service is the BE service; and
    the extracting, by the receiving apparatus, the service comprises:
       determining, by the receiving apparatus, that the $0^{th}$ to $7^{th}$ bits and/or $32^{nd}$ to $35^{th}$ bits of the dedicated code block are the indication field;

determining, by the receiving apparatus, that the $8^{th}$ to $31^{st}$ bits and/or $36^{th}$ to $63^{rd}$ bits of the dedicated code block are the data field; and extracting, by the receiving apparatus, the BE service from the data field.

11. The method according to claim 8, wherein the code block set is a segment of consecutive code blocks on a communications interface or a flexible Ethernet (FlexE) frame.

12. The method according to claim 8, further comprising:
after replacing the dedicated code block with the idle code block to obtain the target code block set, sending, by the receiving apparatus, the target code block set through a communications interface.

13. The method according to claim 12, wherein the service encapsulated in a management channel is a part of the service other than the part of the service encapsulated in the dedicated code block.

14. A sending apparatus, wherein the apparatus comprises a processor, and wherein the processor is configured to:
obtain a code block set;
determine whether the code block set comprises an idle code block;
when the code block set comprises an idle code block, generate a dedicated code block, wherein the dedicated code block comprises an indication field and a data field, the data field is used to carry a service, the indication field carries indication information, and the indication information is used to indicate that the dedicated code block and the data field carry the service;
determine that the $0^{th}$ to $7^{th}$ bits and/or $32^{nd}$ to $35^{th}$ bits of the dedicated code block are the indication field; and
determine that the $8^{th}$ to $31^{st}$ bits and/or $36^{th}$ to $63^{rd}$ bits are the data field;

encapsulate the service into the data field, wherein the service comprises an overhead (OH) service;
configured to replace the idle code block with the dedicated code block to obtain a target code block set; and
send the target code block set.

15. The sending apparatus according to claim 14, wherein the service comprises a best-effort (BE) service or an overhead (OH) service.

16. The sending apparatus according to claim 15, wherein the processor is configured to:
determine that the $0^{th}$ to $7^{th}$ bits and/or $32^{nd}$ to $35^{th}$ bits of the dedicated code block are the indication field; and
determine that the $8^{th}$ to $31^{st}$ bits and/or $36^{th}$ to $63^{rd}$ bits are the data field; and
encapsulate the BE service into the data field.

17. The sending apparatus according to claim 14, wherein the processor is configured to:
determine the service that needs to be added to the dedicated code block.

18. The sending apparatus according to claim 14, wherein the code block set is a segment of consecutive code blocks on a communications interface or a flexible Ethernet (FlexE) frame.

19. The sending apparatus according to claim 14, wherein the processor is configured to:
encapsulate the service into a management channel, wherein the code block set includes the management channel.

20. The sending apparatus according to claim 14, wherein the service encapsulated in a management channel is a part of the service other than the part of the service encapsulated in the dedicated code block.

* * * * *